(12) United States Patent
Bahnsen

(10) Patent No.: US 8,544,390 B1
(45) Date of Patent: Oct. 1, 2013

(54) LAZY SUSAN DEVICE WITH SNAP FIT TOP AND BASE

(76) Inventor: Scott M. Bahnsen, Oldsmar, FL (US)

( * ) Notice: Subject to any disclaimer, the term of this patent is extended or adjusted under 35 U.S.C. 154(b) by 0 days.

(21) Appl. No.: 13/534,683

(22) Filed: Jun. 27, 2012

Related U.S. Application Data

(63) Continuation-in-part of application No. 13/115,190, filed on May 25, 2011.

(60) Provisional application No. 61/433,481, filed on Jan. 17, 2011.

(51) Int. Cl.
*A47B 57/00* (2006.01)
(52) U.S. Cl.
USPC .......................................... 108/94; 248/349.1
(58) Field of Classification Search
USPC ............... 108/20, 94, 95, 139; 248/349.1
See application file for complete search history.

(56) References Cited

U.S. PATENT DOCUMENTS

| | | | |
|---|---|---|---|
| 618,219 A | 1/1899 | Bell | |
| 1,977,092 A | 10/1934 | Scurlock | |
| 1,978,695 A | 10/1934 | Clark | |
| 2,121,711 A | 6/1938 | Patts | |
| 4,362,247 A | 12/1982 | Rueda | |
| D275,256 S | 8/1984 | Gilliam | |
| 4,573,570 A | 3/1986 | Cortopassi | |
| 4,589,713 A * | 5/1986 | Pfuhl et al. | 248/349.1 |
| D285,638 S * | 9/1986 | Trivison | D7/557 |
| D293,994 S | 2/1988 | Conrady et al. | |
| D334,867 S | 4/1993 | May | |
| 5,479,867 A * | 1/1996 | Blevins et al. | 108/94 |
| D368,409 S * | 4/1996 | Schwartz | D7/553.6 |
| D392,852 S | 3/1998 | Weterrings et al. | |
| D393,775 S * | 4/1998 | Otero | D7/553.6 |
| 5,895,022 A * | 4/1999 | Kim | 248/349.1 |
| 6,182,839 B1 | 2/2001 | Robbins et al. | |
| 6,263,808 B1 * | 7/2001 | Robbins et al. | 108/94 |
| D472,771 S | 4/2003 | McGuyer | |
| D489,938 S | 5/2004 | Vipond | |
| D496,831 S | 10/2004 | Strahota et al. | |
| 6,868,794 B2 * | 3/2005 | Bullock et al. | 108/94 |
| 6,997,512 B1 * | 2/2006 | Yu | 108/94 |
| D521,321 S | 5/2006 | McGuyer | |
| 7,083,070 B2 | 8/2006 | McGuyer | |
| D546,127 S * | 7/2007 | Vovan | D7/552.2 |
| 7,320,415 B2 | 1/2008 | McGuyer | |
| 7,806,380 B2 * | 10/2010 | Faull et al. | 248/349.1 |
| 7,934,449 B2 | 5/2011 | Anderson et al. | |
| 8,000,094 B2 * | 8/2011 | Wang et al. | 248/349.1 |
| 2007/0283860 A1 * | 12/2007 | Sun | 108/94 |

* cited by examiner

*Primary Examiner* — Jose V Chen
(74) *Attorney, Agent, or Firm* — Ronald E. Smith; Smith & Hopen, P.A.

(57) ABSTRACT

A lazy susan type device for holding food items has a top and a base that are snap fit to one another when the device is in use. The top and base can therefore be easily separated from one another to facilitate independent washing of those two parts. The snap fit device is a toroidal ring having multiple flexible "L"-shaped arms secured about the outer periphery of the ring. Each arm is momentarily displaced in a radially inwardly direction when the top and base are in the process of being interconnected to one another. The inherent bias of each arm causes each arm to abruptly return to a position of repose when the top and base are fully interconnected to one another. The displacement of each arm when returning to its position of repose is a radially outward displacement.

3 Claims, 4 Drawing Sheets

LAZY SUSAN DEVICE WITH SNAP FIT TOP AND BASE

CROSS REFERENCE TO RELATED APPLICATIONS

This application is a Continuation-In-Part of and claims priority to currently pending U.S. patent application Ser. No. 13/115,190, entitled "LAZY SUSAN DEVICE AND ACCESSORIES," filed May 25, 2011, which is a continuation of U.S. provisional patent application No. 61/433,481, entitled "LAZY SUSAN DEVICE WITH OPENINGS FOR DISHES," filed Jan. 17, 2011, both of which were filed by the same inventor and both of which are hereby incorporated by reference into this application.

BACKGROUND OF THE INVENTION

1. Field of the Invention

This invention relates generally to a lazy susan. More specifically, it relates to a lazy susan type device having a top and a base that are snap fit to one another.

2. Description of the Related Art

Taco dinners are routine for many families. A taco dinner usually includes tortillas (both soft and hard), cheese, lettuce, tomato, onion, hot sauce, sour cream, and any other food or condiment desired for a taco. With so many different items, space and organization becomes a premium.

Lazy susans, also known as turntables, usually include a rotatable top part having a surface upon which multiple edible dishes may be placed and a non-rotatable base that supports the top part. Lazy susans are often used for holding and providing access to various items, including food, condiments, or both, through rotation of the top part relative to the base part.

Conventional lazy susan devices are not easy to clean after use because they are somewhat difficult to take apart. They are also not easy to reassemble after the separate parts have been cleaned.

Accordingly, there is a need for a lazy susan structure that is easy to disassemble for cleaning and easy to reassemble after cleaning.

Earlier lazy susan devices also rely upon ball bearings in a ball race to provide relative rotational movement between the top and bottom or base of the lazy susan structure. Ball bearings are metallic, relatively expensive, and do not facilitate the separation of the rotatable top of a lazy susan from its stationary base.

Thus there is also a need for a lazy susan device that includes no ball bearings.

However, in view of the art considered as a whole at the time the present invention was made, it was not obvious to those of ordinary skill in the art how the needed structure could be provided.

SUMMARY OF THE INVENTION

The longstanding but heretofore unfulfilled need for a lazy susan that can be taken apart and reassembled to facilitate cleaning and which is free of ball bearings is now provided in the form of a new, useful and nonobvious invention.

The novel lazy susan includes a generally disc-shaped top part that includes a generally disc-shaped top wall, a generally disc-shaped base part that includes a generally disc-shaped bottom wall, and an interconnecting member that is secured to a bottom surface of the top wall for conjoint rotation therewith and that releasably engages the bottom wall of the base part when the lazy susan is in an assembled configuration.

The interconnecting member has a flat, toroidal part and a plurality of flexible arms mounted about the outer periphery of the flat toroidal part in circumferentially and equidistantly spaced relation to one another. The plurality of flexible arms depends from the flat, toroidal part. The flat, toroidal part is secured to the bottom surface of the disc-shaped top wall.

A central aperture is formed in the disc-shaped bottom wall and a truncate cylindrical wall depends from the central aperture. The plurality of flexible arms extends through the central aperture and releasably engages an annular free edge of the truncate cylindrical wall to hold the top part and the base part together and to enable relative rotation between the top part and the base part.

A flange circumscribes the bottom wall of the base part and a bulge is formed in the center of the bottom wall of the base part. The central aperture is formed in the center of the bulge. A flat, annular bevel is formed where the bulge meets the truncate cylindrical wall. The bevel displaces each of the flexible arms radially inwardly when the top part and base part are being interconnected to one another.

The flexible arms return to their respective positions of repose under their inherent bias when respective free ends of the arms extend beyond the annular free edge of the truncate cylindrical wall. Each flexible arm snaps radially outwardly under said inherent bias and engages the annular free edge of the truncate cylindrical wall and thus interconnects the top part and base part to one another. The inherent bias is overcome by a user pulling the top part and base apart from one another.

A flange circumscribes the top wall and depends therefrom. A plurality of circumferentially and equidistantly spaced apart recesses is formed in the top wall, radially inwardly of the flange. Each recess of the plurality of recesses has an imperforate floor and is adapted to accommodate a container for a food item.

A central recess is formed in the top wall, has an imperforate bottom wall, and is also adapted to accommodate a container for a food item. A first annular alignment flange is formed integrally with and depends from the bottom wall of the central recess and is concentric with a center of the bottom wall of the central recess. The first annular alignment flange has a diameter substantially equal to a diameter of the toroidal part of the interconnecting member. Accordingly, the first annular alignment flange ensleeves the toroidal part of the interconnecting member.

A second annular alignment flange is formed integrally with and depends from the bottom wall of the central recess, is concentric with the first annular alignment flange, and is disposed radially inwardly thereof.

An alignment pin is formed integrally with and depends from the bottom wall of the central recess, is centered in the bottom wall of the central recess, and is ensleeved within and joined to the second annular alignment flange.

The toroidal part of the interconnecting member is secured to the top wall so that the interconnecting member rotates conjointly with the top part of the lazy susan.

Each arm of the plurality of arms is "L"-shaped and includes a vertical part and a horizontal part. Each arm of the plurality of arms is mounted relative to the flat, toroidal part so that the angle included by the "L"-shape faces radially outwardly.

Each vertical part of each arm is positioned radially inwardly of the first annular alignment flange when the top part and base part are interconnected to one another. Each horizontal part of each arm is positioned in underlying relation to a free annular edge of the truncate cylindrical part when the top part and base part are interconnected to one another.

A plurality of circumferentially and equidistantly spaced apart legs is formed in and depends from a bottom surface of the base part bottom wall. Each leg is spaced slightly radially inwardly from the flange that circumscribes the bottom wall and each leg has a height that slightly exceeds a distance from a bottom surface of the bottom wall to a bottom edge of the flange so that the base part is supported by the legs when the base part is disposed on a table top or other suitable support surface.

An important object of this invention is to provide a lazy susan construction that can be easily taken apart so that its top part and bottom part can be washed separately.

Another important object is to provide a novel interconnecting member that facilitates the separation and reattachment of the top and base parts of a lazy susan.

Another major object is to provide a lazy susan construction that is free of ball bearings.

These and other important objects will become clear as this disclosure continues.

These and other important objects, advantages, and features of the invention will become clear as this disclosure proceeds.

The invention accordingly comprises the features of construction, combination of elements, and arrangement of parts that will be exemplified in the disclosure set forth hereinafter and the scope of the invention will be indicated in the claims.

BRIEF DESCRIPTION OF THE DRAWINGS

For a fuller understanding of the invention, reference should be made to the following detailed description, taken in connection with the accompanying drawings, in which.

DETAILED DESCRIPTION OF THE PREFERRED EMBODIMENT

Figure 1A:
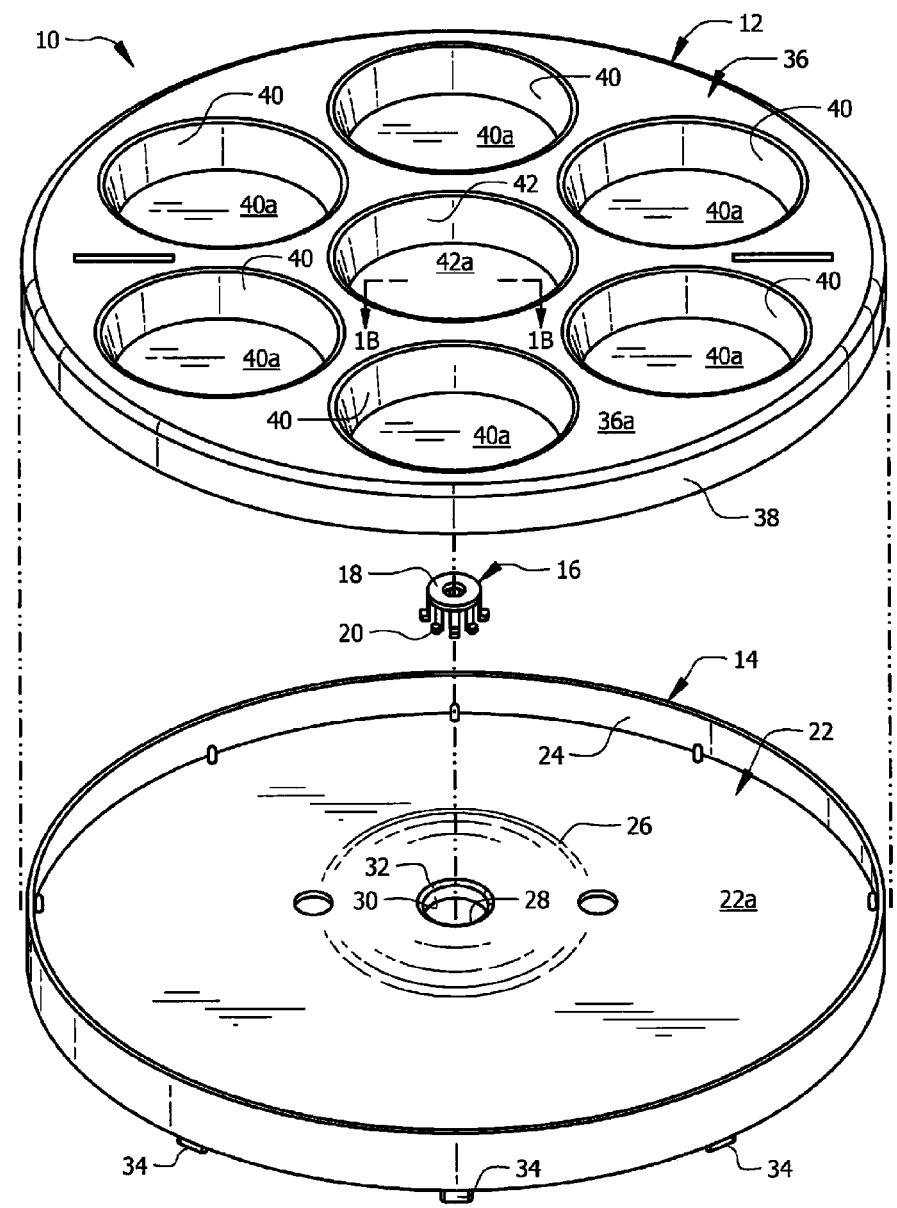
FIG. 1A is an exploded top perspective view of the novel lazy susan base and top.

The novel structure is denoted in FIG. 1 as a whole by the reference numeral 10. Lazy susan 10 includes top part 12 and base or bottom part 14 that are interconnected by interconnecting member 16.

Interconnecting member 16 has a flat, toroidal part 18 and a plurality of "L"-shaped flexible arms, collectively denoted 20, mounted about the outer periphery of said flat toroidal part 18 in circumferentially and equidistantly spaced relation to one another.

Base member 14 includes flat, disc-shaped bottom wall 22 that is circumscribed by flange 24. The top surface of wall 22 is denoted 22a and the bottom surface thereof is denoted 22b in the Figures.

Bulge 26 is formed in the center of wall 22 and central opening 28 is formed in the center of bulge 26 which is also the center of wall 22.

Figure 1B:
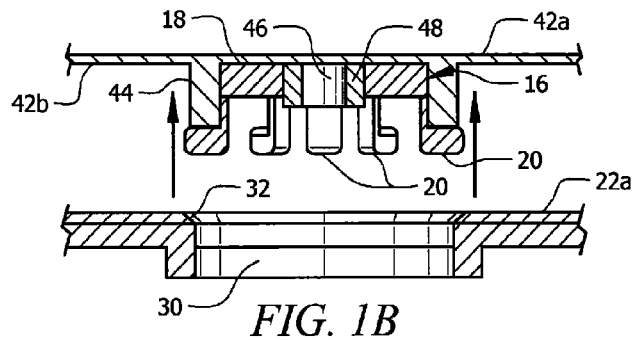
FIG. 1B is a sectional view taken along line 1B-1B in FIG. 1A.
Figure 2:
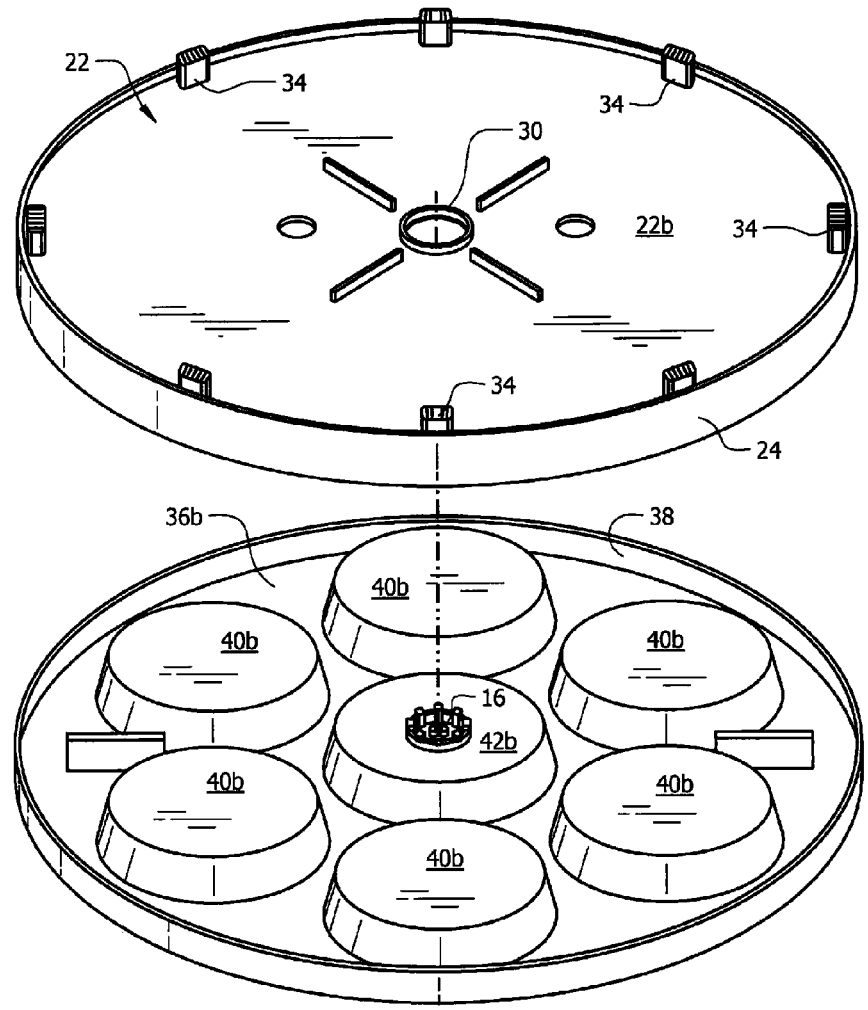
FIG. 2 is a partially exploded, partially assembled bottom perspective view of the novel lazy susan base and top.
Figure 3:
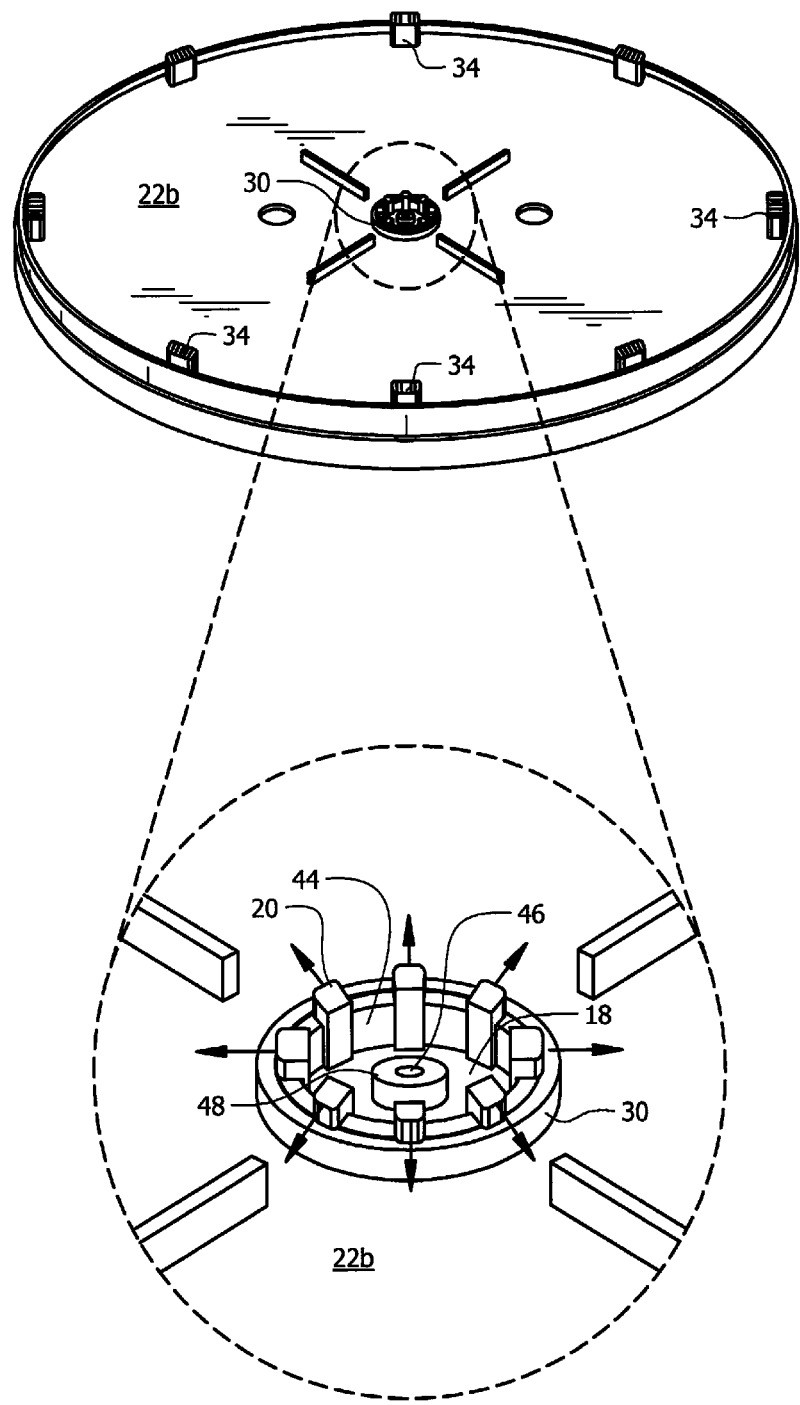
FIG. 3 is a bottom perspective view of the assembled base and top with the central region thereof projected into an enlarged view.

As depicted in FIG. 1A but as perhaps better understood in connection with FIGS. 1B, 2 and 3, truncate cylindrical wall 30 is formed integrally with and depends from central opening 28.

Figure 4:
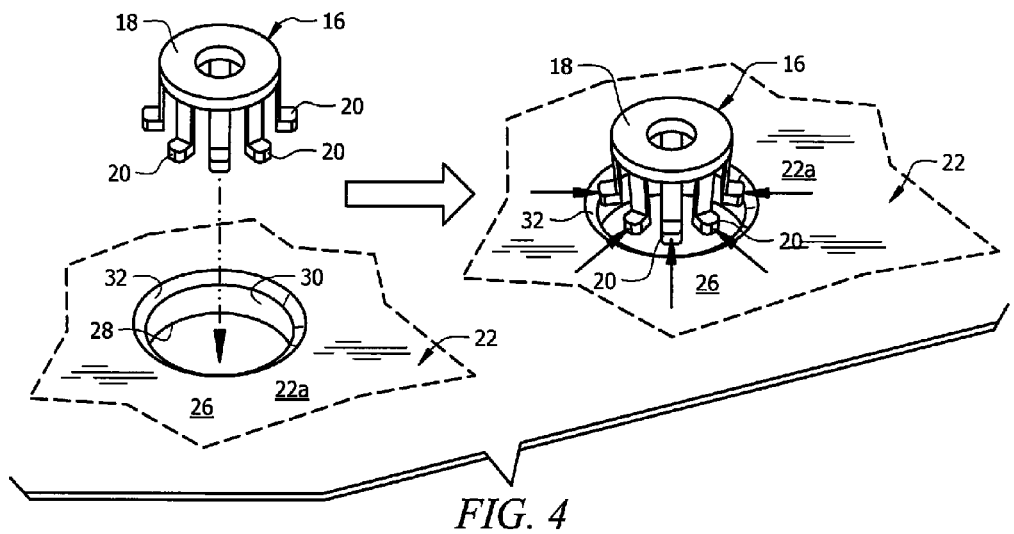
FIG. 4 is a two step perspective view animation depicting the snap fit connector in repose and when compressed.

A flat, annular bevel 32 is formed where bulge 26 meets cylindrical wall 30. As best depicted in FIG. 4, bevel 32 displaces each flexible arm 20 of novel interconnecting member 16 radially inwardly when top 12 and base 14 are being interconnected to one another.

As indicated in FIG. 3, arms 20 return to their respective positions of repose when the respective free ends of said arms clear the annular free end of truncate cylindrical wall 30. Each arm 20 snaps radially outwardly under its inherent bias as indicated in said FIG. 3, thereby engaging the annular free edge of truncate cylindrical wall 30 and thus interconnecting top 12 and base 14 to one another. Significantly, top 12 is free to rotate relative to base 14, and vice versa, when said parts are so interconnected.

However, due to the flexibility of arms 20, a user desiring to separate top 12 and base 14 from one another so that they can be thoroughly cleaned by hand or in a dish washer can overcome the radially outward inherent bias of said arms and drive them momentarily radially inwardly so that said top and base may be separated from one another.

Figure 5:
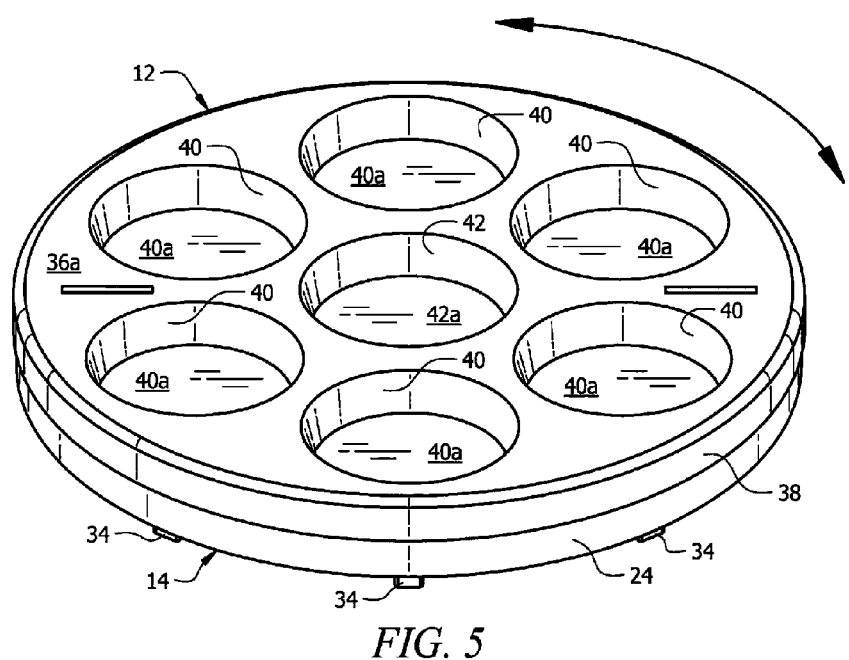
FIG. 5 is a top perspective view of the assembled lazy susan.

FIGS. 2, 3 and 5 depict a plurality of circumferentially and equidistantly spaced apart legs, collectively denoted 34, that is formed in and depends from the bottom surface 22b of bottom wall 22. Each leg is spaced slightly radially inwardly from flange 24 as depicted and each leg has a length or height that slightly exceeds the distance from bottom surface 22b of bottom wall 22 to the bottom of flange 24 so that base 14 is supported by said legs when base 14 is disposed on a table top or other suitable support surface.

Top part 12 includes disc-shaped top wall 36 and flange 38 that circumscribes said top wall 36 and depends therefrom. The top surface of top wall 36 is denoted 36a and the bottom surface thereof is denoted 36b in the Figures.

Plural circumferentially and equidistantly spaced apart recesses, collectively denoted 40, are formed in top wall 36, slightly radially inwardly of flange 38. Each recess has an imperforate floor or bottom wall 40a and is adapted to accommodate a container for a food item.

Central recess 42 also has an imperforate bottom wall, the upper surface of which is denoted 42a and the lower or bottom surface of which is denoted 42b. Central recess 42 is also adapted to accommodate a container for a food item.

The depth of recesses 40 and 42 exceeds the height of flange 38 as depicted in FIG. 2.

Although FIG. 1A depicts interconnecting member 16 in exploded relation to top 12 and base 14 for conceptual purposes, it should be understood that interconnecting member 16 is permanently connected to top 12 and is not separable therefrom.

As best depicted in FIG. 1B, first annular alignment flange 44 is formed integrally with the bottom wall of central recess 42 (said bottom wall having upper surface 42a and lower surface 42b) and depends therefrom in concentric relation to the center of said bottom wall. The inner diameter of first annular alignment flange 44 is substantially equal to the diameter of toroidal part 18 of novel interconnecting member 16 so that said toroidal part fits snugly into said first annular alignment flange. In a preferred embodiment, toroidal part 18 is melted into the central recess bottom wall so that it becomes an integral part thereof.

Alignment pin 46 depends from the center of said central recess bottom wall. It is also preferably formed integrally with said central recess bottom wall.

Second annular alignment flange 48 also depends from the central recess bottom wall and is also concentric with the center of the central recess bottom wall, but is smaller in diameter and is therefore positioned radially inwardly of first annular alignment flange 44. The inner diameter of second annular alignment flange 48 is substantially equal to the diameter of alignment pin 46 so that alignment pin 46 fits snugly into second annular alignment flange 48.

Each arm 20 is "L"-shaped as best depicted in FIGS. 1B, 3 and 4 and therefore has a vertical part and a horizontal part. Said vertical and horizontal parts are not individually numbered to avoid cluttering of the drawings. Each arm 20 is mounted so that the angle included by the "L"-shape faces radially outwardly.

First annular alignment flange 44 is ensleeved within truncate cylindrical wall 30 when top 12 and base 14 are interconnected to one another as best understood in connection with FIG. 1B.

As best depicted in FIG. 3, the horizontal part of each flexible and resilient arm 20 is positioned in underlying relation (overlying as depicted, underlying when the novel lazy susan is in its operable, upright position) to the free annular edge of truncate cylindrical wall 30, thereby interlocking top 12 and base 14 to one another while allowing free rotation of interconnecting device 16 and top 12 relative to base 14. Intentional manual separation of said top 12 and base 14 from one another will drive arms radially inwardly and release the lock.

It will thus be seen that the objects set forth above, and those made apparent from the foregoing disclosure, are efficiently attained. Since certain changes may be made in the above construction without departing from the scope of the invention, it is intended that all matters contained in the foregoing disclosure or shown in the accompanying drawings shall be interpreted as illustrative and not in a limiting sense.

It is also to be understood that the following claims are intended to cover all of the generic and specific features of the invention herein disclosed, and all statements of the scope of the invention that, as a matter of language, might be said to fall therebetween.

What is claimed is:

1. A lazy susan, comprising:

a generally disc-shaped top part that includes a generally disc-shaped top wall;

a generally disc-shaped base part that includes a generally disc-shaped bottom wall;

an interconnecting member that is secured to a bottom surface of said top wall for conjoint rotation therewith and that releasably engages said base part when the lazy susan is in an assembled configuration;

said interconnecting member having a flat, toroidal part and a plurality of flexible arms mounted about the outer periphery of said flat toroidal part in circumferentially and equidistantly spaced relation to one another, said plurality of flexible arms depending from said flat, toroidal part;

said flat, toroidal part secured to said bottom surface of said disc-shaped top wall;

a central aperture formed in said disc-shaped bottom wall;

a truncate cylindrical wall depending from said central aperture;

said plurality of flexible arms extending through said central aperture and releasably engaging an annular free edge of said truncate cylindrical wall to hold said top part and said base part together and to enable relative rotation between said top part and said base part;

a flange circumscribing said bottom wall of said base part;

a bulge formed in the center of said bottom wall of said base part;

said central aperture formed in the center of said bulge;

a flat, annular bevel formed where said bulge meets said truncate cylindrical wall;

said bevel displacing each of said flexible arms radially inwardly when said top part and base part are being interconnected to one another;

said flexible arms returning to respective positions of repose when respective free ends of said arms extend beyond said annular free edge of said truncate cylindrical wall, each flexible arm snapping radially outwardly under its inherent bias and engaging said annular free edge of said truncate cylindrical wall and thus interconnecting said top part and base part to one another;

said inherent bias being overcome by a user pulling said top part and base apart from one another;

a flange that circumscribes said wall of said top part and depends therefrom;

a plurality of circumferentially and equidistantly spaced apart recesses formed in said top wall, radially inwardly of said flange;

each recess of said plurality of recesses having a floor and being adapted to accommodate a container for a food item;

a central recess formed in said to wall of said top part, said central recess having a bottom wall and said central recess adapted to accommodate a container for a food item;

a first annular alignment flange formed integrally with and depending from said bottom wall of said central recess, said first alignment flange being concentric with a center of said bottom wall of said central recess, said first alignment flange having a diameter substantially equal to a diameter of said toroidal part of said interconnecting member, and said first annular alignment flange ensleeving said toroidal part of said interconnecting member;

a second annular alignment flange formed integrally with and depending from said bottom wall of said central recess, said second annular alignment flange being concentric with said first annular alignment flange and disposed radially inwardly thereof; and an alignment pin formed integrally with and depending from said bottom wall of said central recess, said alignment pin centered in said bottom wall of said central recess and said alignment pin being ensleeved within and joined to said second annular alignment flange so that said interconnecting member rotates conjointly with said alignment pin when said top part of said lazy susan rotates with respect to said base part of said lazy susan.

2. The lazy susan of claim 1, further comprising:

each arm of said plurality of arms being "L"-shaped, including a vertical part and a horizontal part;

each arm of said plurality of arms being mounted relative to said flat, toroidal part so that the angle included by the "L"-shape faces radially outwardly;

each vertical part of each arm being positioned radially inwardly of said first annular alignment flange when said top and said base are interconnected to one another;

each horizontal part of each arm being positioned in underlying relation to a free annular edge of said truncate cylindrical part when said top and said base are interconnected to one another.

3. The lazy susan of claim 1, further comprising:
a plurality of circumferentially and equidistantly spaced apart legs formed in and depending from a bottom surface of said bottom wall of said base part, each leg spaced slightly radially inwardly from said flange that circumscribes said bottom wall and each leg having a height that slightly exceeds a distance from a bottom surface of said bottom wall to a bottom edge of said flange so that said base part is supported by said legs when said base part is disposed on a table top or other suitable support surface.

* * * * *